No. 865,284. PATENTED SEPT. 3, 1907.
D. WOOLF.
EYEGLASSES.
APPLICATION FILED SEPT. 14, 1906.
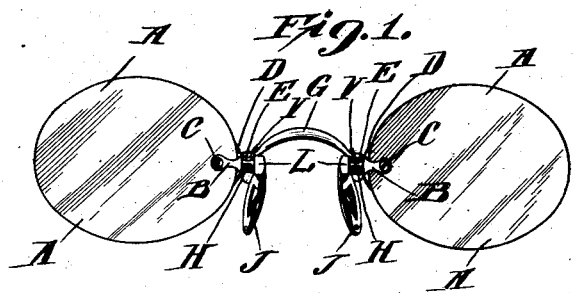
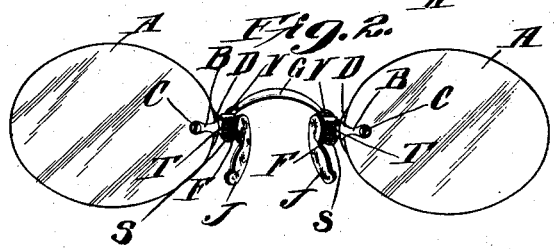
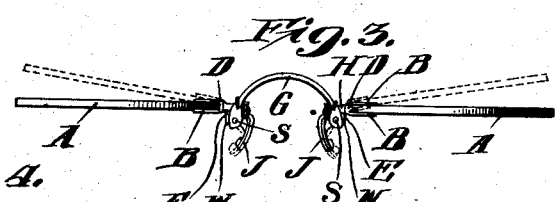
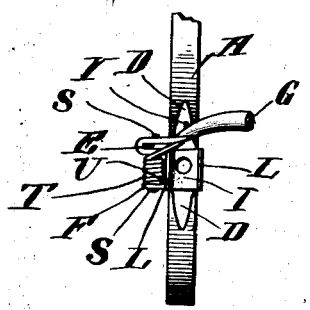
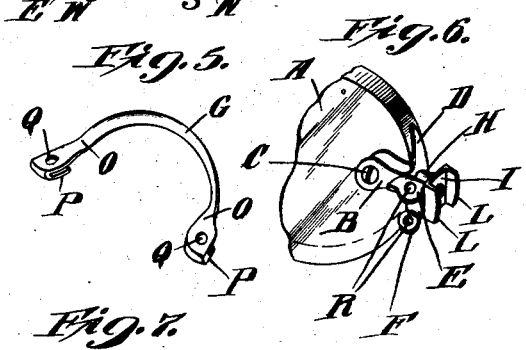
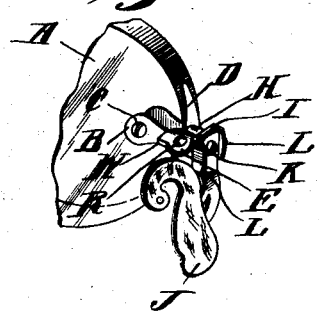
Attest:
Inventor:
DANIEL WOOLF
by Dickerson, Brown, Raegener
& Binney
Attys.

UNITED STATES PATENT OFFICE.

DANIEL WOOLF, OF NEW YORK, N. Y.

EYEGLASSES.

No. 865,284.  Specification of Letters Patent.  Patented Sept. 3, 1907.

Application filed September 14, 1906. Serial No. 334,564.

*To all whom it may concern:*

Be it known that I, DANIEL WOOLF, a citizen of the United States, and a resident of the borough of Manhattan, city, county, and State of New York, have invented certain new and useful Improvements in Eyeglasses, of which the following is a specification, accompanied by drawings.

This invention relates to improvements in eye glasses, more particularly to that style of eye glasses having a substantially rigid or stiff bridge or nose piece.

The invention has for its objects to improve and simplify the construction of such eye glasses and enable them to be more readily adjusted to the nose of the wearer, without the addition of a multiplicity of parts which render the eye glasses cumbersome and unsightly.

Another important object of the invention is to permit the attachment of different styles of nose guards or grips as desired without interfering with the operation of the glasses or requiring that they be taken apart to change the nose guards.

Further objects of the invention will hereinafter appear and to these ends the invention consists of eye glasses for carrying out the above objects embodying the features of construction, combinations of elements, and arrangement of parts having the general mode of operation substantially as hereinafter fully described and claimed in this specification and shown in the accompanying drawings, in which,—

Figure 1 is a front elevation of the eye glasses; Fig. 2 is a rear elevation of the eye glasses; Fig. 3 is a top plan view of the eye glasses; Fig. 4 is a transverse detail elevation with the guard removed; Fig. 5 is a perspective view of the bridge; Fig. 6 is a detail perspective view of the lens clamp; Fig. 7 is a perspective view of the guard secured to its box.

Referring to the drawings, each lens A is held in a lens clamp B, by suitable means as the screws C. The lens clamps B have posts or studs H projecting inwardly therefrom, to which are connected the braces D and the rearwardly extending perforated ears E and F, for pivotally connecting the stiff or rigid bridge G to the clamps, so that the clamps and lenses may be swung relatively to the bridge as shown in dotted lines in Fig. 3. The perforations or apertures R in the ears are preferably screw threaded for the reception of the screw threaded pivot pins S. The studs H are also formed with boxes I at their inner ends to enable suitable nose guards or clips J to be detachably connected to the clamps in the boxes, as by means of the screws K. According to this construction the guards J and lenses A may be swung or moved together, relatively to the rigid bridge G and different styles of guards may be attached as desired without taking the eye glasses apart or interfering in any way with the pivotal connections between the bridge and the lens clamps. The boxes I are preferably provided with the protecting and guiding flanges L for steadying the guards and enabling them to be more securely held in position in the boxes.

The bridge G as shown is preferably provided with twisted and flattened ends O, the tips of which are bent into the forms of hooks P perforated at Q for the reception of the pivot pins. These perforated hooks P are placed or hooked over the upper ears E of the lens clamps, so that the apertures or perforations R in the ears E register with the apertures Q in the upper and lower sides of the hooks. The screw threaded pivot pins S are passed through the screw threaded apertures R in the ears E and F, and through the apertures in the hooks P after the ends of the bridge have been hooked over the ears E. The pins S also pass through spiral springs T arranged between the pins, the lower ends U of said springs bearing against the lower ears F, while the upper ends V of the springs are preferably passed in front of the ends of the bridge. These springs T are so wound that they normally retract or force the stops W on the ears E against the ends of the hooks P, and thus hold the lenses in proper alinement normally, as illustrated in full lines in Fig. 3. The lenses may be moved or rotated against the force of the springs into the position indicated by the dotted lines in Fig. 3, by moving the lens clamps about the pivot pins S.

I am not to be understood as limiting the invention to the particular form of springs shown, nor is the invention limited to the particular form of stops for limiting the movement of the lens clamps, since any suitable form of springs and stops may be provided.

According to this invention, a very compact and neat construction is provided, in which the connections and moving parts are hidden from sight as the eye glasses are viewed from in front, and from the rear very little of the operating parts can be seen. The ears E and F project rearwardly directly behind the post or stud H so that they are partially hidden by said post and do not form unsightly projections. The ends of the bridge are so pivoted to the lens clamps, that the clamps swing under the bridge, and the pivot pins S and the retracting springs T are hidden in front view.

In the rear view the construction is so compact that little can be seen of the pivotal connections and the nose guards J hide the principal part of said connections. The boxes I are so constructed that they do not interfere in any way with the operation and adjustment of the eye glasses, while the box flanges L serve to hide the connection of the guards to the boxes.

In general appearance my improved eye glasses strikingly resemble the ordinary simple eye glasses having a spring bridge and no pivotal connections between the bridge and the lens clamps, because in my eye glasses, the parts are arranged for simplicity and efficiency in operation with the fewest number of parts for accomplishing the desired results.

Obviously some features of this invention may be used without others and the invention may be embodied in widely varying forms, therefore, without limiting the invention to the devices shown and described, and without enumerating equivalents, I claim and desire to obtain by Letters Patent the following:—

1. Eye glasses having clamps provided with means for supporting lenses, a stiff or rigid bridge pivotally connected to the clamps, nose guards, and provision on the clamps permitting the attachment and detachment of said nose guards without interfering with the connections of the lenses and pivotal connections of the stiff bridge to the clamps.

2. Eye glasses having clamps provided with means for supporting lenses, a stiff or rigid bridge pivotally connected to the clamps, nose guards, and provision on the clamps permitting the attachment and detachment of said nose guards without disconnecting or loosening the pivotal connections of the stiff bridge or interfering with the connections of the lenses to the clamps.

3. A lens clamp for eye glasses provided with means for supporting the lens, means for pivoting a bridge therein, and means for detachably connecting a guard thereto, independently of the provision for supporting the lens.

4. A lens clamp for eye glasses provided with means for supporting the lens, means for pivoting a bridge thereon, and separate means for detachably connecting a guard thereto independently of the provision for holding the lens and the pivotal bridge connections.

5. A lens clamp for eye glasses having ears for pivoting a bridge thereon, and a box independent of the lens supporting portion and ears for connecting a guard to the clamp.

6. A lens clamp for eye glasses having ears for pivoting a bridge thereon, and a box independent of the ears and means for holding the lens, for detachably connecting a guard to the clamp.

7. Eye glasses having lens clamps, ears on said clamps, a bridge pivotally connected to said ears, recessed boxes on said clamps, and guards connected to said boxes independently of the ears for the bridge.

8. Eye glasses having lens clamps, ears on said clamps, a bridge pivotally connected to said ears, recessed boxes on said clamps, and guards detachably connected to said boxes independently of the ears for the bridge.

9. Eye glasses having lens clamps provided with ears, a bridge pivotally connected to said ears, a spring bearing against the bridge, stops for limiting the movement of the bridge, and boxes independent of the lens supports and ears for connecting guards to the clamps.

10. Eye glasses having lens clamps provided with ears, and a bridge having hooked ends adapted to engage an ear on each clamp.

11. A lens clamp for eyeglasses provided with lens supporting means, means for pivotally receiving a bridge end, and means independent of said lens supporting and bridge receiving means for detachably receiving a nose guard.

12. Eye glasses having clamps provided with lens supporting means, means for pivotally receiving bridge ends, means independent of said lens supporting and bridge receiving means for detachably receiving nose guards, and a stiff or rigid bridge having its ends pivotally connected to said clamps.

13. Eye glasses having clamps provided with lens supporting means, means for pivotally receiving bridge ends, means independent of said lens supporting and bridge receiving means for detachably receiving nose guards, a stiff or rigid bridge having its ends pivotally connected to said clamps, and springs bearing against said bridge.

14. Eye glasses having clamps provided with lens supporting means, means for pivotally receiving bridge ends, means independent of said lens supporting and bridge receiving means for detachably receiving nose guards, a stiff or rigid bridge having its ends pivotally connected to said clamps, and springs independent of said bridge bearing against said bridge.

15. Eyeglasses having lens clamps provided with means for supporting the lenses, means for pivoting a bridge thereon, means for detachably connecting guards thereto, independently of the provision for supporting the lenses, and a stiff or rigid bridge pivoted at each end to said clamps.

16. Eyeglasses having lens clamps provided with means for supporting the lenses, means for pivoting a bridge thereon, means for detachably connecting guards thereto, independently of the provision for supporting the lenses, a stiff or rigid bridge pivoted at each end to said clamps, and springs independent of said bridge bearing against said bridge.

In testimony whereof I have signed this specification in the presence of two subscribing witnesses.

DANIEL WOOLF.

Witnesses:
 OLIN A. FOSTER,
 A. L. O'BRIEN.